(12) United States Patent
Tippelhofer et al.

(10) Patent No.: US 8,676,400 B2
(45) Date of Patent: Mar. 18, 2014

(54) NAVIGATION SYSTEM AND METHOD FOR AN ELECTRIC VEHICLE TRAVELLING FROM A STARTING POINT TO A DESTINATION

(75) Inventors: Mario Tippelhofer, San Mateo, CA (US); Stefan Sellschopp, Palo Alto, CA (US); Jessica Riley, Mountain View, CA (US)

(73) Assignees: Volkswagen AG, Wolfsburg (DE); Audi AG, Ingolstadt (DE)

( * ) Notice: Subject to any disclaimer, the term of this patent is extended or adjusted under 35 U.S.C. 154(b) by 0 days.

(21) Appl. No.: 13/365,586

(22) Filed: Feb. 3, 2012

(65) Prior Publication Data

US 2013/0204456 A1    Aug. 8, 2013

(51) Int. Cl.
*G05D 1/00*    (2006.01)
(52) U.S. Cl.
USPC ............................................................ 701/1
(58) Field of Classification Search
USPC .................................................... 701/1, 423
See application file for complete search history.

(56) References Cited

U.S. PATENT DOCUMENTS

| | | | |
|---|---|---|---|
| 2002/0188387 A1* | 12/2002 | Woestman et al. | 701/22 |
| 2008/0275644 A1* | 11/2008 | Macneille et al. | 701/209 |
| 2009/0088965 A1* | 4/2009 | Burckart et al. | 701/201 |
| 2010/0256846 A1 | 10/2010 | Shaffer | |

FOREIGN PATENT DOCUMENTS

| | | |
|---|---|---|
| DE | 10 2009 048 821 A1 | 4/2011 |
| DE | 10 2010 028 356 A1 | 11/2011 |
| EP | 2 385 349 A1 | 11/2011 |
| WO | WO 2011/134992 A1 | 11/2011 |

OTHER PUBLICATIONS

PCT/ISA/206 with Partial International Search Report for PCT/EP2013/051790 dated Oct. 25, 2013.

* cited by examiner

*Primary Examiner* — James Trammell
*Assistant Examiner* — Michael D Lang
(74) *Attorney, Agent, or Firm* — Muncy, Geissler, Olds & Lowe, P.C.

(57) ABSTRACT

A method for an electric vehicle travelling from a starting point to a destination, a navigation system for an electric vehicle, a method for charging an electrical energy storage device of an electric vehicle, a charger for charging an electrical energy storage device of an electric vehicle, and an electric vehicle are described.

12 Claims, 4 Drawing Sheets

NAVIGATION SYSTEM AND METHOD FOR AN ELECTRIC VEHICLE TRAVELLING FROM A STARTING POINT TO A DESTINATION

BACKGROUND OF THE INVENTION

1. Field of the Invention

The present invention relates to a method for an electric vehicle travelling from a starting point to a destination, a navigation system for an electric vehicle, a method for charging an electric energy storage device of an electric vehicle, and a charger for charging an electrical energy storage device of an electric vehicle.

2. Description of the Conventional Art

Current vehicle navigation systems essentially provide route guidance to the user-defined destination. Some effort has been done to provide additional weather-related information, for example the weather forecast along the route and at the time of arrival, for informational and convenience reasons to the driver. Conventional combustion engines of vehicles are not significantly impacted in their performance or fuel range by weather conditions. On the other hand, the performance of electric vehicles is greatly influenced by differences in temperature, wind resistance or rain. Furthermore, the behaviour of battery packs in the electric vehicles can be extremely temperature-dependent when being charged and discharged. In some cases, the vehicle's battery management system may allow charging and/or discharging of the batteries only within a certain temperature range as otherwise the chemistry of the cells may be degraded and the batteries may start losing their capacity. In cases where the temperature of the cells reaches extremely hot or cold temperatures, this may cause damage to the cells and may lead to degradation in lifetime or even dangerous thermal runaway situations of the batteries.

SUMMARY OF THE INVENTION

According to an embodiment, a method for an electric vehicle travelling from a starting point to a destination is provided. According to the method, weather forecasts on a route from the starting point to the destination are determined, and a state of charge of an electrical energy storage device of the vehicle along the route is estimated based on the weather forecasts.

According to another embodiment, a navigation system for an electric vehicle is provided. The navigation system comprises a receiver for receiving wheather forecasts on a route from a starting point to a destination, and a processing unit. The processing unit is configured to estimate a state of charge of an electrical energy storage device of the vehicle along the route based on the weather forecasts.

According to yet another embodiment of the present invention, a method for charging an electrical energy storage device of an electric vehicle is provided. According to the method, a temperature forecast for a charging location where the electric vehicle is to be charged is determined. Furthermore, a charging starting time for starting a charging of the electrical energy storage device is determined depending on the temperature forecast.

According to a further embodiment of the present invention, a charger for charging an electrical energy storage device of an electric vehicle is provided. The charger comprises a receiver for receiving a temperature forecast for a charging location where the electric vehicle is to be charged, and a processing unit configured to determine a charging starting time for starting a charging of the electrical energy storage device depending on the temperature forecast.

According to a further embodiment, an electric vehicle is provided. The electric vehicle comprises an electrical engine for propelling the electric vehicle, and an electrical energy storage device for providing electrical energy to the electrical engine. The electric vehicle comprises furthermore at least one of a navigation system or a charger. The navigation system comprises a receiver for receiving weather forecasts on a route from a starting point to a destination, and a processing unit configured to estimate a state of charge of the electrical energy storage device along the route based on the weather forecasts. The charger comprises a receiver for receiving a temperature forecast for a charging location where the electric vehicle is to be charged, and a processing unit configured to determine a charging starting time for starting a charging of the electrical energy storage device depending on the temperature forecast.

Although specific features described in the above summary and the following detailed description are described in connection with specific embodiments, it is to be understood that the features of the embodiments described can be combined with each other unless it is noted otherwise.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
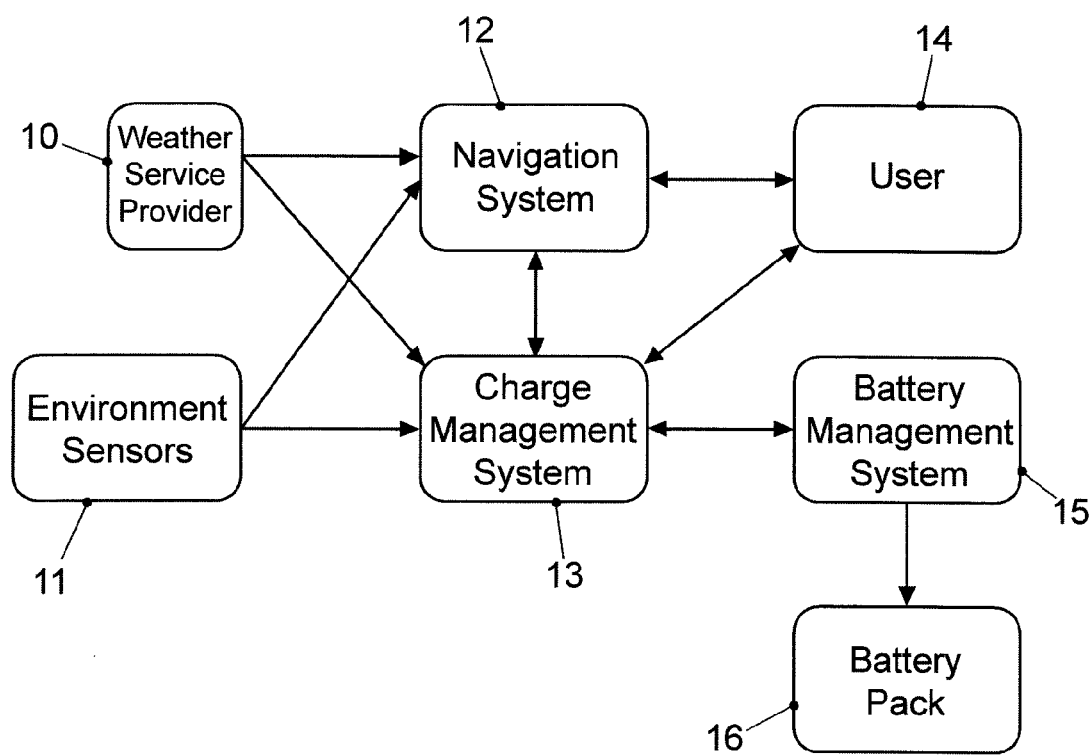
FIG. 1 shows a system diagram of subsystems of an electric vehicle according to an embodiment of the present invention.

In the following, exemplary embodiments of the invention will be described in detail. It is to be understood that the following description is given only for the purpose of illustrating the principles of the invention and is not to be taken in a limiting sense. Rather, the scope of the invention is defined only by the appended claims and not intended to be limited by the exemplary embodiments hereinafter.

It is to be understood that in the following detailed description of the various embodiments, any direct connection or coupling between functional blocks, devices, systems, components or other physical or functional units shown in the drawings or described herein could also be implemented in an indirect connection or coupling. Same reference signs in the various instances of the drawings refer to similar or identical components. It is furthermore to be understood that the features of the various exemplary embodiments described herein may be combined with each other unless specifically noted otherwise.

According to an embodiment of the present invention, weather forecasts on a route from a starting point to a destination are determined and a state of charge of an electrical energy storage device of the electrical vehicle along the route is estimated based on the weather forecasts. The starting point may comprise the current position of the electric vehicle determined based on a global positioning system, for example GPS. The destination may be entered by a user of the electric vehicle into a navigation system of the electric vehicle. The weather forecasts may be received from public services via a wireless connection, for example a radio frequency connection based on GSM, GPRS, UMTS or WLAN. The estimated state of charge of the electrical energy storage device along the route is used to optimize the route from the starting point to the destination, for example by calculating different routes from the starting point to the destination and selecting one of the routes taking into account the weather forecasts on the different routes.

According to a further embodiment, for charging an electrical energy storage device of an electric vehicle, a temperature forecast for a charging location where the electric vehicle is to be charged is determined, and based on the temperature forecast a charging starting time for starting a charging of the electrical energy storage device is determined.

FIG. 1 shows a system diagram of involved subsystems for performing the above-described routing and charging methods. A weather service provider 10 provides weather forecasts concerning temperature, wind, precipitation and sunshine for locations along a calculated route of a navigation system 12 and a next location for charging a battery pack 16 of the vehicle. Furthermore, environment sensors 11 may provide current temperature information to the navigation system 12 and a charge management system 13. The navigation system 12 may utilize the current temperature and the information from the weather service provider 10 to calculate a state of charge of the battery pack 16 along a calculated route and thus a driving range when driving along the calculated route. Furthermore, the navigation system 12 may calculate an impact of the future weather conditions on a battery life of the battery pack 16. Based on the weather conditions, the navigation system may calculate alternative routes and/or starting times for travelling and propose these alternatives to a user or driver 14. The charge management system 13 may propose alternative charging windows to the user 14 based on the weather conditions and may optimize a charging strategy for a battery management system 15 based on the predicted temperature during charging.

A weather-aware navigation and charging strategy management system may benefit the driver of the electric vehicle, overall efficiency, and lifetime of the battery pack. There are various online database providers which allow access to detailed real-time weather conditions for specific locations as well as forecasts as far as a few days in the future, for example up to 10 or 14 days. The navigation and charging system may be able to analyze the current weather conditions, the weather conditions predicted along the route, as well as the weather conditions when the vehicle is parked at a location for charging the battery. These pieces of information may be used to adjust the possible driving range due to the impact of the weather as well as to optimize the battery charging strategy. There are several possible weather-dependent scenarios that may affect the range and lifetime of the battery.

A first scenario relates to the temperature. Generally, battery cells work most efficiently when used within an optimal temperature range particular to the specific chemistry of the cells of the battery. Changes in temperature affect the electrical resistance of the motor, battery cells and so on, which has an effect on the range of the vehicle. Furthermore, battery packs work most efficiently when being charged and discharged within a certain temperature range. In some chemistries and packages, charging in extremely cold temperature can cause irreparable damage to the batteries. This can affect the efficiency and lifetime of the battery pack. Another factor in cold weather driving is the human comfort factor. When driving in cold weather, the driver tends to turn on the heater of the vehicle to keep the temperature of a cabin of the vehicle at a comfortable level. The driver may also turn on a seat heater to keep the body from getting to cold. These additional power consumers may use up more energy from the battery which in turn decreases the possible range of the vehicle.

But also warm weather may affect efficiency and lifetime of the battery. In situations where the outside temperature reaches a high enough level to affect the battery chemistry, it may lead to degradation in battery life and damage to battery cells. Extreme temperatures may lead to overheating of the battery pack and a possible hazardous situation. If the temperature rises, the battery management system may need to use additional energy to cool the batteries to a temperature range where it is safe to operate. Furthermore, a driver of the vehicle may turn on an air conditioning system to keep the temperature of a cabin at a comfortable level.

Wind resistance may also affect the efficiency and driving range of the vehicle. When the electric vehicle faces head wind, the efficiency goes down dramatically because the engine has to compensate the additional force on the vehicle by wind. If the navigation system is aware of head wind or tail wind situations along the route, this can be taken into account when calculating the vehicle range or when selecting a route to the destination.

Sunshine may also affect the efficiency and driving range of electric vehicles. The chassis and body of a vehicle in bright sunlight tends to heat up internally. This will also heat up the battery module and the temperature inside the cabin. The effect on the battery is the same as described above in connection with warm temperatures. On the other hand, for vehicles which are equipped with solar panels on the roof, the sun can have an impact on possible energy generation along the route.

In case of rain along the route, the battery has to supply additional electrical power to electrical consumers like the wind shield wiper motors. Another factor is the effect of rain on the street. Rain diminishes friction between the tires and the road and therefore increases the rolling resistance which as a result may lead to higher energy consumption to move the vehicle.

All of the above-mentioned scenarios may be taken into account when calculating a route to a destination, an estimated driving range of the vehicle as well as when to charge the battery of the vehicle for optimal efficiency and lifetime of the battery pack. For validation and more accurate values, the weather conditions may be measured by onboard vehicle sensors, e.g. temperature sensors.

Figure 2:
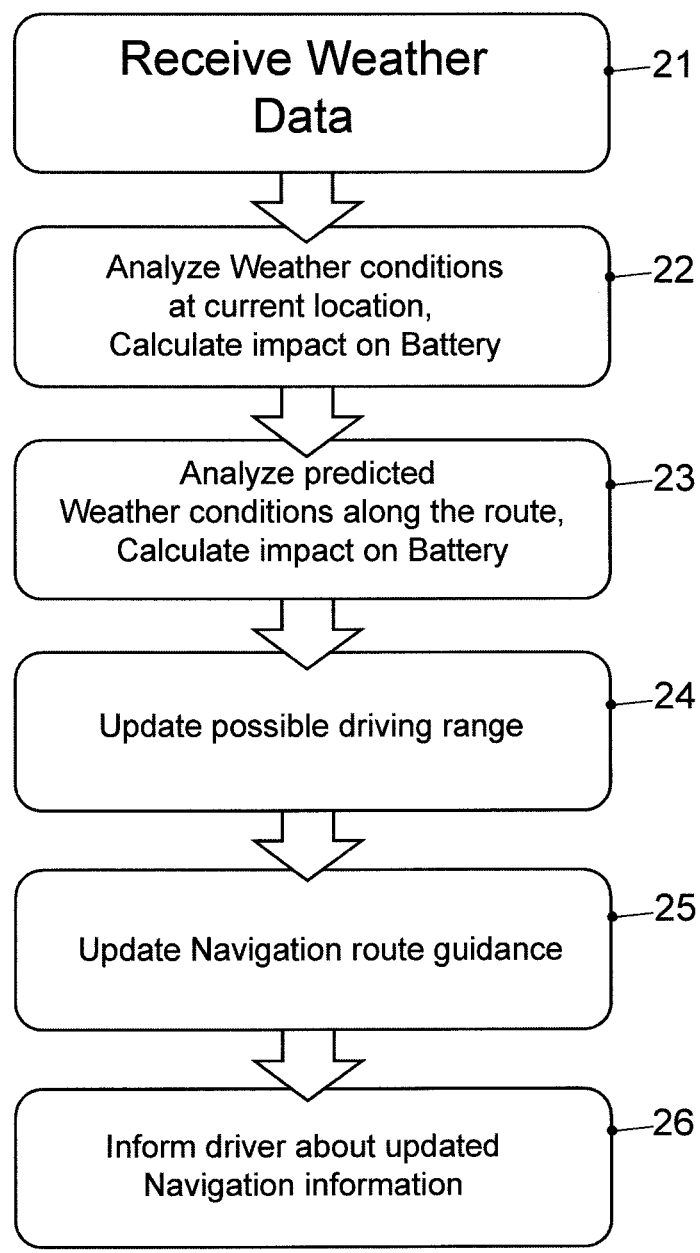
FIG. 2 shows a flowchart of a weather-dependent navigation route guidance according to an embodiment of the present invention.

FIG. 2 shows a weather-dependent route calculation in more detail. In step 21, weather data is received from a weather service provider. In step 22, the weather conditions at the current location are analysed and an impact on the battery is calculated. In step 23, the predicted weather conditions along the route are analysed and an impact on the battery is calculated, e.g. a state of charge of the battery along the route. In step 24, a possible driving range is updated based on the estimated or calculated state of charge along the route. In step 25, navigation route guidance may be updated. For updating the navigation route guidance, an alternative route from the starting point to the destination may be calculated and the weather forecasts for the alternative route may be determined. Based on the weather forecast for the alternative route, a state of charge of the battery is estimated along the alternative route. By comparing the state of charge of the original route and alternative route a route for navigating from the starting point to the destination may be selected or a proposal for changing the route is output to the user. Based on the user selection or on an automatic selection algorithm, the navigation route guidance is updated and in step 26, the driver is informed about the updated navigation information.

According to a further embodiment, based on the weather forecasts on the route, energy consumption or a state of charge of the battery may be estimated for different points of time for starting travelling. For example, when travelling is delayed for a few hours, head winds may calm down or environmental temperatures may become such that less electrical energy is needed to drive from the starting point to the destination at the later travelling time. This information may be output to the driver.

Figure 3:
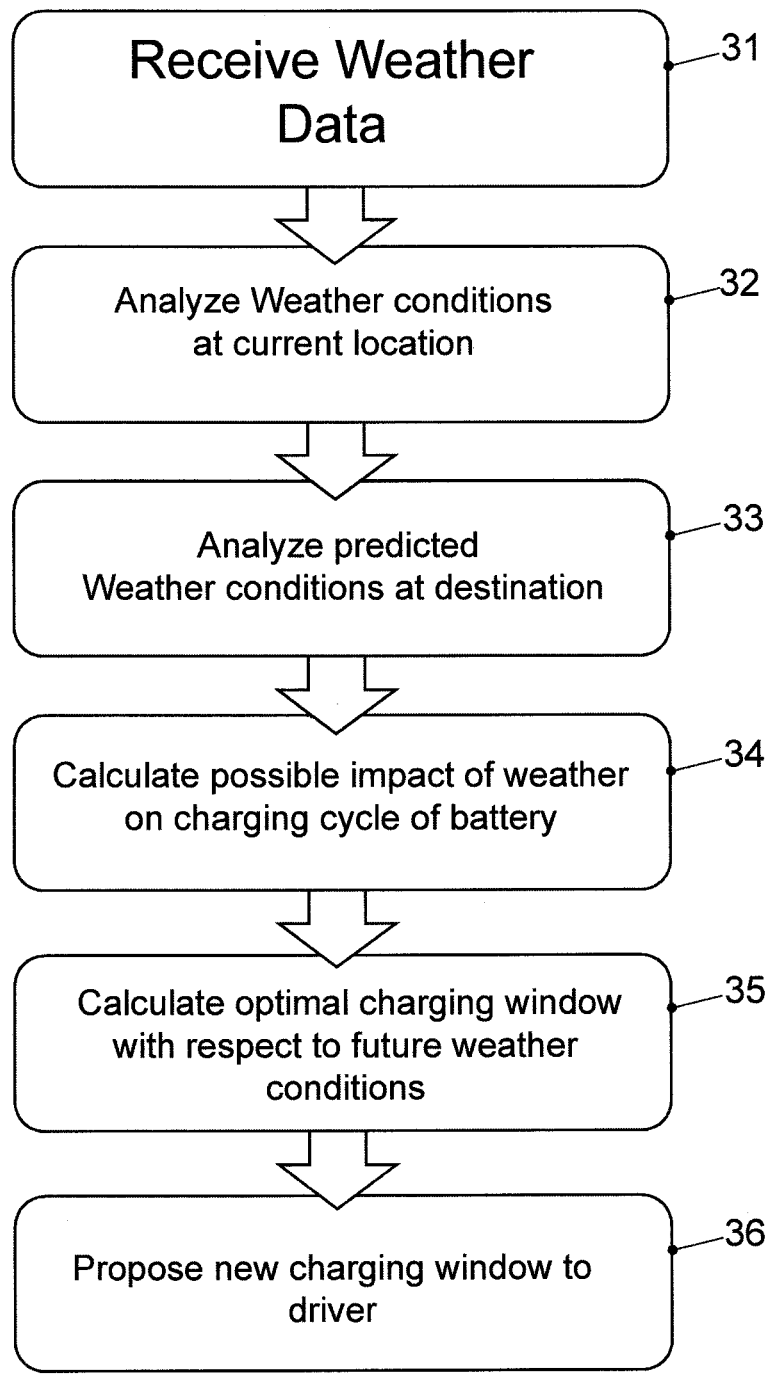
FIG. 3 shows a flowchart of a weather-dependent charging strategy according to an embodiment of the present invention.

FIG. 3 shows a weather-aware charging of the battery of an electrical vehicle. In step 31, weather data is received from a weather service provider. In step 32, weather conditions at the current location or a future destination are analysed. The received predicted weather conditions at the current location or the destination are analysed in step 33, and in step 34 a possible impact of the weather on a charging cycle or a lifetime of the battery is calculated. Based on the predicted weather conditions, an optimal charging window for charging the battery is calculated in step 35. The optimal charging window is output to the driver as a proposal and the driver may acknowledge the proposed charging window or overrule the proposed charging window if, e.g. a faster charging is needed.

The weather-aware charging will be described in the following by way of examples. The vehicle is plugged-in over night for charging. The weather forecast predicts a drop in temperature below zero degrees Celsius around midnight and an increase in temperature in the morning hours. In this case, it might be beneficial to move the charge window to the morning hours to avoid too cold temperatures for the battery pack while charging. When the vehicle is to be charged during daytime and hot temperatures are predicted, it may be beneficial to wait until the temperature drops below a certain threshold before charging the vehicle's battery to increase efficiency.

Figure 4:
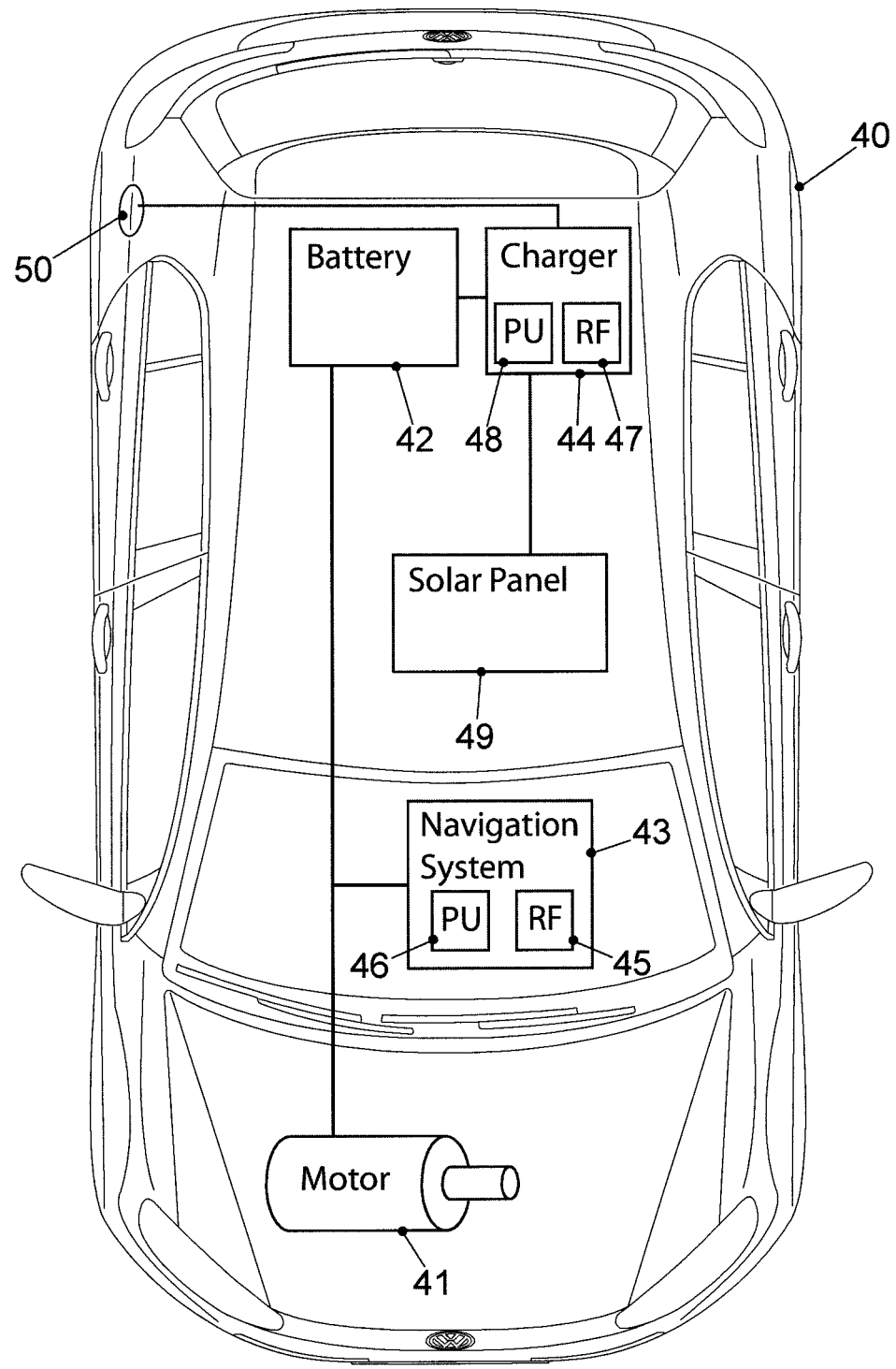
FIG. 4 shows schematically a vehicle comprising a charger and a navigation system according to an embodiment of the present invention.

FIG. 4 shows schematically an electric vehicle according to an embodiment of the present invention. The electric vehicle 40 comprises an electrical engine 41 for propelling the electric vehicle 40. The electric vehicle 40 comprises furthermore an electrical energy storage device 42, e.g. a battery, for providing electrical energy to the electrical engine 41. The electric vehicle 40 comprises furthermore a navigation system 43 and a charging system 44. The navigation system 43 comprises a receiver 45 for receiving weather forecasts about weather on a route from a starting point to a destination which has been calculated by a processing unit 46 of the navigation system 43. The processing unit 46 estimates a state of charge of the battery 42 along the route based on the weather forecasts. The charger system 44 is adapted to charge the battery 42, e.g. with electrical energy from a solar panel 49 or electrical energy provided via a connector 50 from an energy grid. The charger system 44 comprises a receiver 47 for receiving a temperature forecast for a charging location where the electric vehicle 40 is to be charged. Furthermore, the charger system 44 comprises a processing unit 48 configured to determine a charging starting time for starting a charging of the battery 42 depending on the temperature forecast.

While exemplary embodiments have been described above, various modifications may be implemented in other embodiments. For example, the electrical energy storage device 42 may comprise any kind of rechargeable battery or a fuel cell. Furthermore, the navigation system and the charger system 44 may be combined such that a common processing unit and a common receiver may be used.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for an electric vehicle travelling from a starting point to a destination, the method comprising:
   determining, using a vehicle navigation system, weather forecasts on a route from the starting point to the destination, the weather forecasts including a predicted temperature along the route;
   estimating a state of charge of an electrical energy storage device of the vehicle along the route based on the weather forecasts; and
   proposing a charging strategy for the electrical energy storage device based on the predicted temperature during charging.

2. The method according to claim 1, further comprising:
   calculating at least one alternative route from the starting point to the destination;
   determining weather forecasts on the at least one alternative route;
   estimating a further state of charge of the electrical energy storage device along the at least one alternative route based on the weather forecasts; and
   selecting a route for navigating from the starting point to the destination based on the estimated state of charge and the further estimated state of charge.

3. The method according to claim 1, wherein determining weather forecasts on the route comprises determining weather forecasts on the route for a first point of time for starting travelling, and wherein the method further comprises:
   determining weather forecasts on the route for a second alternative point of time for starting travelling;
   estimating a state of charge of the electrical energy storage device along the route based on the weather forecasts for the second point of time for starting travelling; and
   outputting an information indicating the first point of time, the further point of time and an information indicating an effect of the first point of time and the further point of time on the state of charge of the electrical energy storage device along the route.

4. The method according to claim 1, wherein determining weather forecasts comprises at least one of:
   determining temperature forecasts for the route sections on the route from the starting point to the destination;
   determining wind forecasts for the route sections on the route from the starting point to the destination;
   determining precipitation forecasts for the route sections on the route from the starting point to the destination; or
   determining sunshine forecasts for the route sections on the route from the starting point to the destination.

5. The method according to claim 4, wherein estimating the state of charge of the electrical energy storage device comprises at least one of:
   estimating an amount of energy needed for propelling the vehicle along the route depending on at least one of the wind forecasts or the precipitation forecasts;
   estimating an amount of energy needed for air conditioning an interior of the vehicle driving along the route depending on the temperature forecasts;

estimating an amount of energy needed for air conditioning the electrical energy storage device of the vehicle driving along the route depending on the temperature forecasts;

estimating a temperature of the electrical energy storage device of the vehicle along the route depending on the temperature forecasts; or estimating an amount of energy provided by a solar panel of the vehicle driving along the route depending on the sunshine forecasts.

6. The method according to claim 4, further comprising: determining an influence of changes in the state of charge of the electrical energy storage device on a lifetime of the electrical energy storage device depending on the temperature forecasts.

7. The method according to claim 1, further comprising: determining a current ambient temperature of the vehicle; and estimating a current state of charge of the electrical energy storage device of the vehicle depending on the current ambient temperature.

8. The method according to claim 1, further comprising: determining a driving range based on the state of charge of the electrical energy storage device and the amount of energy needed for driving along the route.

9. The method according to claim 8, further comprising: determining a driving cycle of the vehicle from trip history; and determining the driving range additionally based on the driving cycle.

10. The method according to claim 1, wherein said determining weather forecasts comprises receiving weather forecasts from a public weather service.

11. The method according to claim 1, wherein the weather forecasts include future weather conditions.

12. A navigation system for an electric vehicle, comprising:

a receiver configured to receive weather forecasts on a route from a starting point to a destination, the weather forecasts including a predicted temperature along the route; and a processing unit configured to estimate a state of charge of an electrical energy storage device of the vehicle along the route based on the weather forecasts and to propose a charging strategy for the electrical energy storage device based on the predicted temperature during charging.

* * * * *